(12) United States Patent
Lee

(10) Patent No.: US 8,433,293 B2
(45) Date of Patent: Apr. 30, 2013

(54) APPARATUS AND METHOD FOR PROVIDING CONTENTS PUSH SERVICE, AND MOBILE TERMINAL AND OPERATION METHOD THEREOF

(75) Inventor: Ho-Jin Lee, Goyang-Si (KR)

(73) Assignee: KT Corporation, Seongnam (KR)

( * ) Notice: Subject to any disclaimer, the term of this patent is extended or adjusted under 35 U.S.C. 154(b) by 413 days.

(21) Appl. No.: 12/447,886

(22) PCT Filed: Nov. 8, 2007

(86) PCT No.: PCT/KR2007/005627
§ 371 (c)(1),
(2), (4) Date: Apr. 29, 2009

(87) PCT Pub. No.: WO2008/056951
PCT Pub. Date: May 15, 2008

(65) Prior Publication Data
US 2010/0069044 A1 Mar. 18, 2010

(30) Foreign Application Priority Data

Nov. 8, 2006 (KR) .................. 10-2006-0109768

(51) Int. Cl.
*H04L 12/58* (2006.01)
(52) U.S. Cl.
USPC ......... 455/412.1; 455/466; 455/418; 455/419
(58) Field of Classification Search ............... 455/412.1, 455/466, 418, 419
See application file for complete search history.

(56) References Cited

U.S. PATENT DOCUMENTS

| | | | |
|---|---|---|---|
| 6,421,781 B1 | 7/2002 | Fox et al. | |
| 6,963,554 B1 * | 11/2005 | Weigand | 370/347 |
| 2003/0154243 A1 * | 8/2003 | Crockett et al. | 709/203 |
| 2005/0083929 A1 * | 4/2005 | Salo et al. | 370/389 |
| 2005/0237977 A1 * | 10/2005 | Sayeedi | 370/331 |
| 2006/0077897 A1 * | 4/2006 | Kotzin | 370/235 |
| 2006/0104228 A1 * | 5/2006 | Zhou et al. | 370/328 |
| 2006/0176861 A1 * | 8/2006 | Schmidt | 370/337 |
| 2007/0004391 A1 * | 1/2007 | Maffeis | 455/418 |
| 2007/0206557 A1 * | 9/2007 | Iyer et al. | 370/338 |
| 2010/0265860 A1 * | 10/2010 | Xue et al. | 370/310 |

FOREIGN PATENT DOCUMENTS

| | | |
|---|---|---|
| JP | 2000-078207 | 3/2000 |
| KR | 10-2005-0009508 A | 1/2005 |
| KR | 10-2005-0095058 A | 9/2005 |
| KR | 10-2005-0095198 A | 9/2005 |
| KR | 10-2006-0076864 A | 7/2006 |

* cited by examiner

*Primary Examiner* — Barry Taylor
(74) *Attorney, Agent, or Firm* — Sughrue Mion, PLLC

(57) ABSTRACT

The present invention relates to an apparatus and method of providing a content push service, a mobile terminal, and a method of operating a mobile terminal. According to an exemplary embodiment of the present invention, a user datagram protocol (UDP) port is set between the mobile terminal and a content push service providing server. In addition, the mobile terminal drives an application that receives the content push service through the set user datagram protocol (UDP) port, by the request of the content push service providing server. The mobile terminal receives the content push service from the content push service providing server through the driven application. Accordingly, it is not necessary to select a specific identifier for each of existing applications and recognize a specific identifier for each node of the mobile communication network.

15 Claims, 4 Drawing Sheets

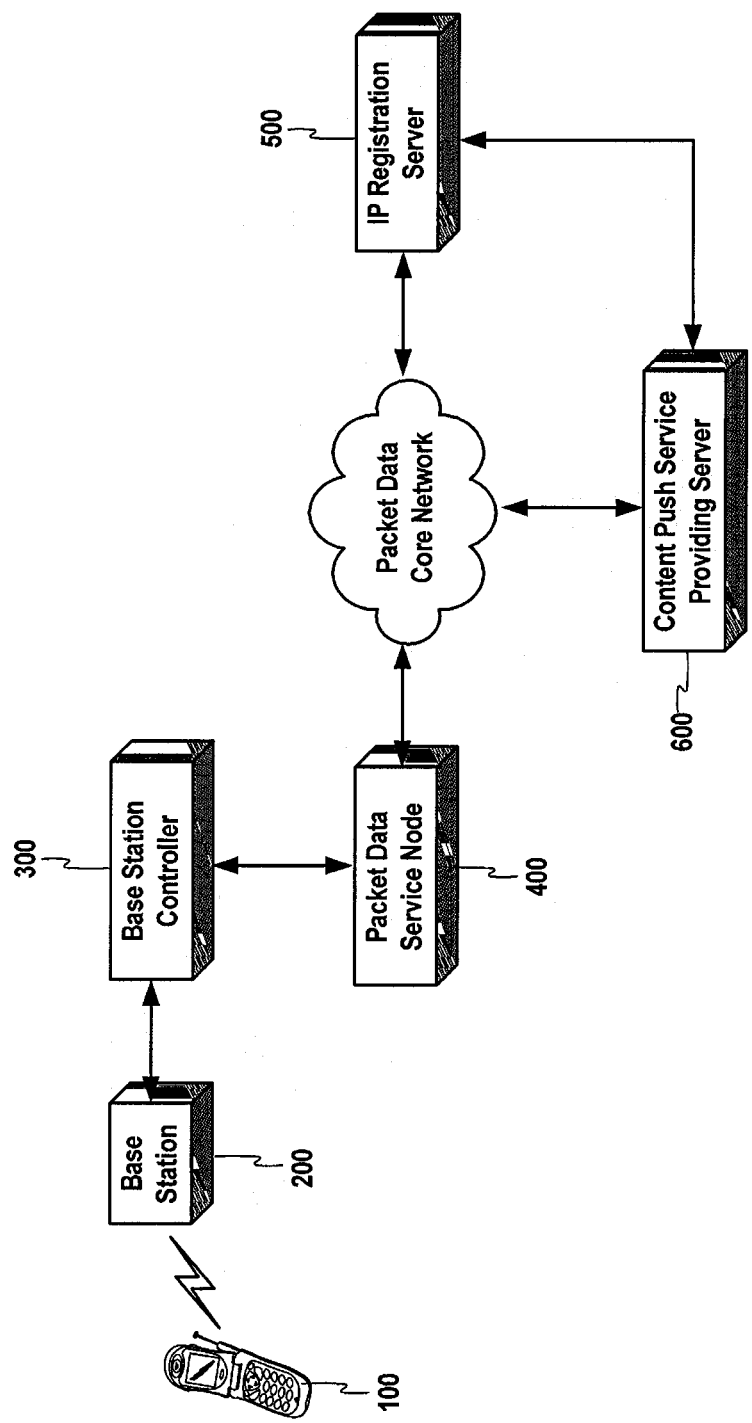
[FIG. 1]

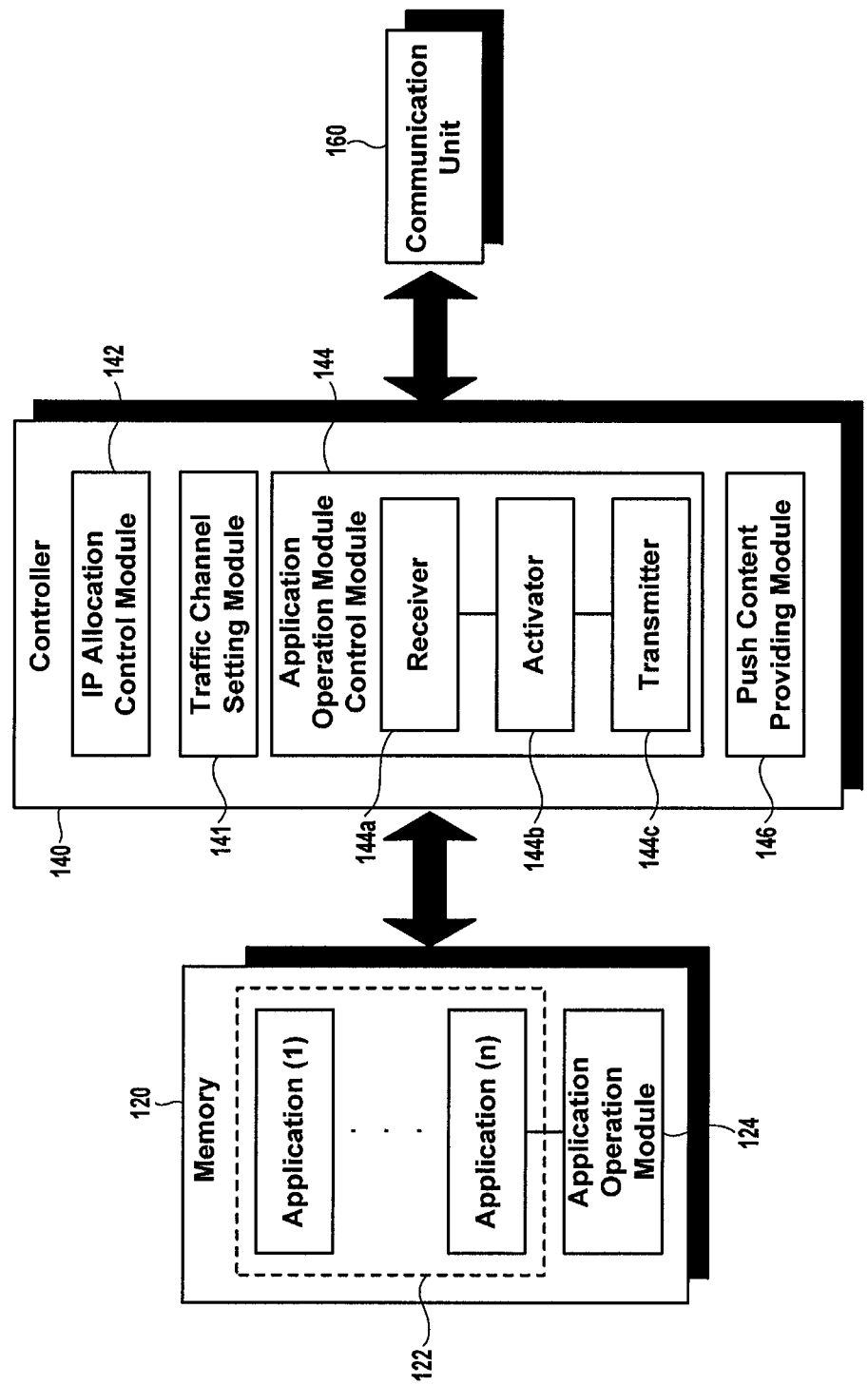
[FIG. 2]

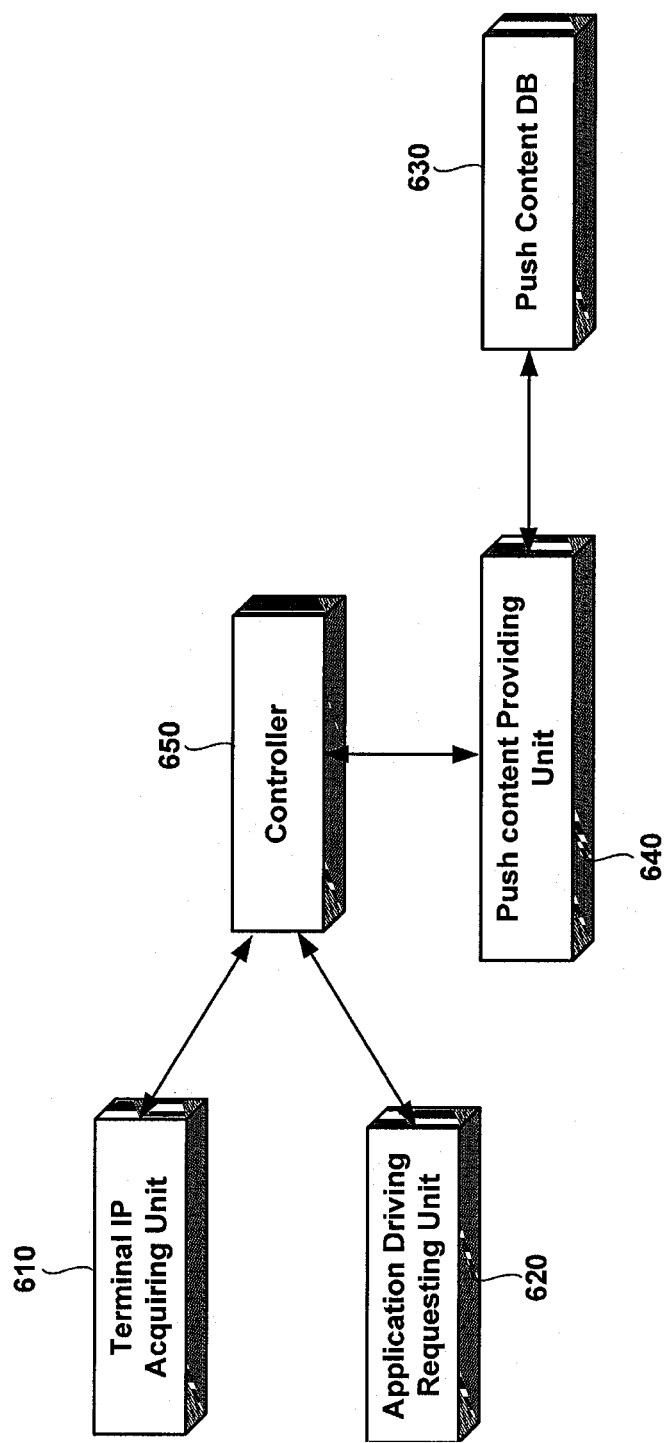

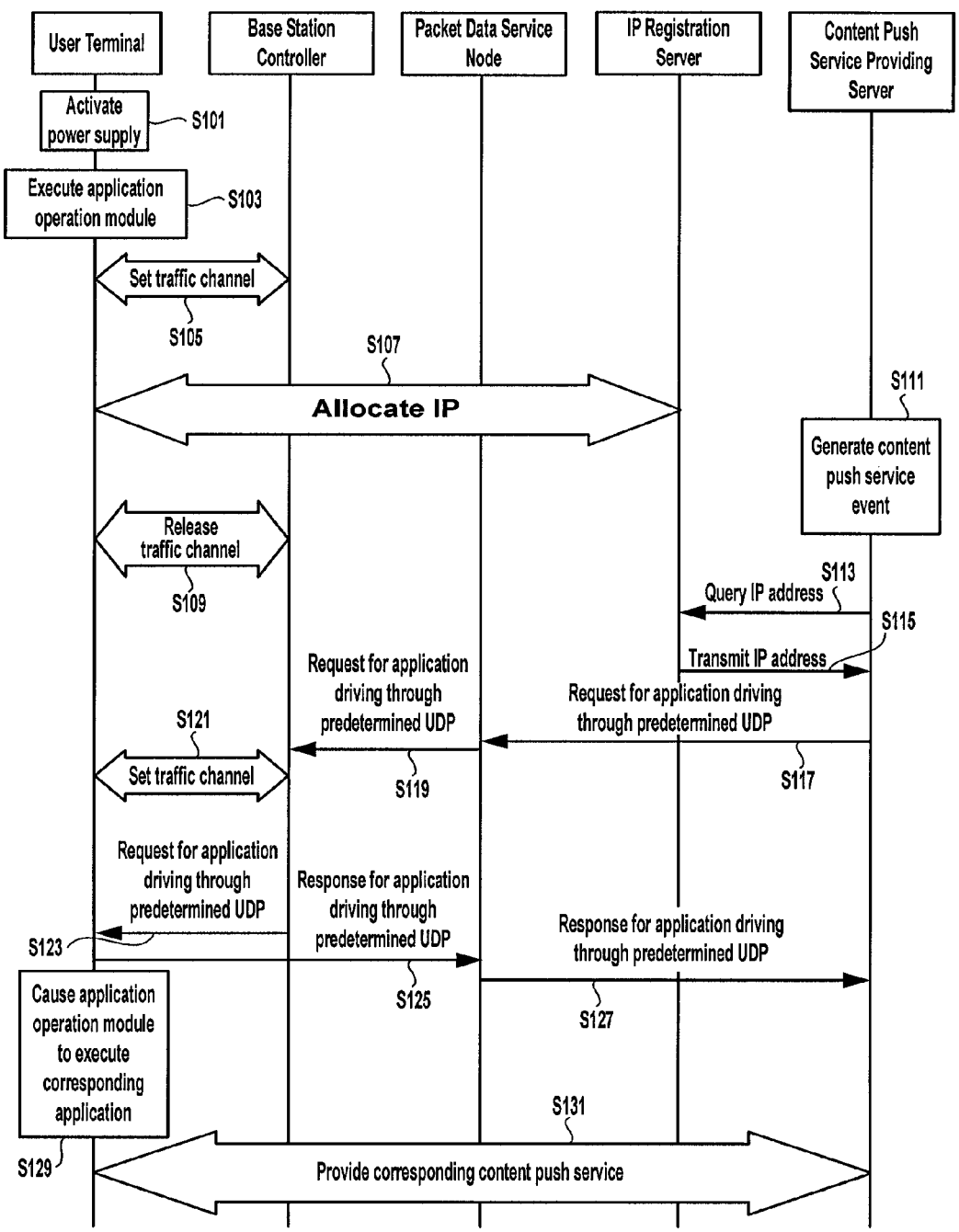
[FIG. 4]

APPARATUS AND METHOD FOR PROVIDING CONTENTS PUSH SERVICE, AND MOBILE TERMINAL AND OPERATION METHOD THEREOF

TECHNICAL FIELD

The present invention relates to a content push service. More particularly, the present invention relates to a method and apparatus for providing a content push service in a state where an application is not driven, a mobile terminal therefor, and a method of operating a mobile terminal.

BACKGROUND ART

A content push service is a service that automatically transmits information on a server to a client or terminal when a server operation is performed, but does not perform a search operation, which is requested from a user on the client side or the terminal side, in the wired/wireless Internet or mobile communication service. The content push service is opposite to a content pull service that searches information from a server that is requested by the user on the client side.

According to the content push service, the next-generation mobile communication service actively provides necessary information to a mobile communication terminal of a user who requests various services, such as weather, stock, and sports information, at a designated time or when a specific event is generated.

In the related art, an application server for providing a content push service can provide contents to a client or terminal in a state where the corresponding terminal drives a corresponding application.

However, if the number of applications for the content push services loaded on the terminal side increases, power consumption on the terminal side, which is needed to drive the applications, increases.

For this reason, since all of the applications that are loaded in the terminal cannot be continuously driven, the application server uses a notification method using SMS.

That is, by using a unique identifier named "Teleservice ID", the application server sends an "SMS Notification" message to the terminal in order to request the terminal to drive a corresponding application. Then, the terminal drives the corresponding application and receives a content push service.

To do so, all of the terminals, that is, an SMSC (short message service center) and an MSC (mobile switching center), need to recognize a unique identifier named "Teleservice ID". Thus, the unique identifier named "Teleservice ID" needs to be managed like system data of the mobile communication system.

Further, since each content push service provider needs to set a unique identifier named "Teleservice ID" to a corresponding application, if it is not approved by a specific mobile communication provider, it is not possible for a content push service provider to provide the content push service.

That is, for each push content, the "Teleservice ID" needs to be set to a corresponding application, and all of the terminals, the SMSC, and the MSC need to recognize the "Teleservice ID". As a result, it becomes complicated to develop an application, and the time needed to develop the application is increased.

DISCLOSURE

Technical Problem

The present invention has been made in an effort to provide an apparatus and a method of providing a content push service, a mobile terminal therefor, and a method of operating a mobile terminal, having advantages of driving an application corresponding to a content push service that is requested by an application server by using the standardized user datagram protocol (UDP) between a terminal and the application server.

Technical Solution

An exemplary embodiment of the present invention provides a mobile terminal for providing a content push service. The mobile terminal includes a memory that stores applications for receiving various push contents and an application operation module for executing the applications, and a controller that sets a user datagram protocol (UDP) port with a server for providing the content push service in accordance with the request of the server, activates the application operation module that is stored in the memory, and drives an application that receives push contents to be provided by the server through the set user datagram protocol port.

Another embodiment of the present invention provides a method of operating a mobile terminal to provide a content push service. The method includes receiving a driving request for an application that receives push contents provided by a server for providing a content push service through a user datagram protocol port set between the server and the mobile terminal, activating an application operation module that executes the application to drive the driving requested application by the activated application operation module in response to the driving request for the application, and receiving the push contents provided by the server through the user datagram protocol port to execute the push contents through the driven application.

Yet another embodiment of the present invention provides an apparatus for providing a content push service to a mobile terminal through a mobile communication network. The apparatus includes a terminal IP acquiring unit that acquires an IP of a mobile terminal that receives the content push service through the mobile communication network, an application driving requesting unit that uses the IP acquired by the terminal IP acquiring unit and requests the mobile terminal to drive an application that receives the content push service, a push content providing unit that provides push contents to the mobile terminal through the mobile communication network, and a controller that acquires the IP of the mobile terminal through the terminal IP acquiring unit, drives the application in the mobile terminal through the application driving requesting unit, and provides the push content service to the mobile terminal through the push content providing unit.

Still another embodiment of the present invention provides a method in which a server for providing a content push service provides the content push service to a mobile terminal through a mobile communication network. The method includes acquiring an IP of the mobile terminal through the mobile communication network, transmitting a driving request for an application that receives push contents provided by the server through a user datagram protocol port set between the server and the mobile terminal using the acquired IP to the mobile terminal, and providing the content push service to the mobile terminal through the mobile communication network when a response message for the driving request for the application is received from the mobile terminal.

According to an embodiment of the present invention, there is provided a method of providing a content push service in a mobile communication network. The method includes receiving a driving request for an application in a mobile terminal that receives the content push service from a server for providing the content push service connected to the mobile communication network, the driving request including an IP of the mobile terminal, and setting a traffic channel between the mobile terminal and the server, transmitting the driving request for the application received from the server to the mobile terminal through the set traffic channel, and providing the content push service provided by the server through a user datagram protocol port set between the mobile terminal and the server to the mobile terminal.

DESCRIPTION OF DRAWINGS

FIG. 1 is a diagram illustrating a structure of a mobile communication system for providing a content push service according to an exemplary embodiment of the present invention.

FIG. 2 is a diagram illustrating an internal structure of a mobile terminal for providing a content push service according to an exemplary embodiment of the present invention.

FIG. 3 is a diagram illustrating an internal structure of a content push service providing server according to an exemplary embodiment of the present invention.

FIG. 4 is a flowchart illustrating a series of processes of a method of providing a content push service according to an exemplary embodiment of the present invention.

BEST MODE

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise" and variations such as "comprises" or "comprising" will be understood to imply the inclusion of stated elements but not the exclusion of any other elements.

The term "module" used herein means one unit that processes a specific function or operation, and may be implemented by hardware, software, or a combination thereof.

A method of providing a content push service, a mobile communication system, and a mobile terminal according to an exemplary embodiment of the present invention will now be described in detail with reference to the accompanying drawings.

FIG. 1 is a diagram illustrating a structure of a mobile communication system for providing a content push service according to an exemplary embodiment of the present invention.

Referring to FIG. 1, a mobile terminal 100 is connected to a mobile communication network, and includes a plurality of applications for receiving contents for each content push service. Further, an application operation module that executes the plurality of applications is mounted in the mobile terminal 100. Using a user datagram protocol (UDP) that is set according to a prior agreement with a content push service providing server 600, the application operation module is connected to the content push service providing server 600 to receive a content push service from the content push service providing server 600.

The mobile communication system for providing a content push service includes a base station 200, a base station controller 300, a packet data service node 400, an IP registration server 500, and the content push service providing server 600.

The base station 200 enables wireless communication between the mobile terminal 100 and the mobile communication system through a wireless access network. The base station 200 performs a wireless access terminating function with the mobile terminal 100 based on the wireless access standard, and exchanges information with the mobile terminal 100 using a function of transmitting/receiving sounds, images, and data traffic through a transmitting/receiving antenna.

The base station controller 300 performs wired/wireless channel management, protocol matching of the mobile terminal 100, and the like to set a traffic channel for IP allocation in accordance with the request of the mobile terminal 100.

The packet data service node 400 is an IP-based packet serving node that is connected to a packet data core network. The packet data service node 400 allocates an IP address to the mobile terminal 100 to provide a packet data service, manages a session, performs a packet data routing function, and provides an interface to connect the internet network and the packet data core network. The packet data service node 400 may be a packet data serving node (PDSN) or a gateway GPRS Serving node (GGSN).

The IP registration server 500 receives the IP address that is allocated to the mobile terminal 100, and registers and manages the IP address. The IP registration server 500 provides the IP address when the content push service providing server 600 requests the IP address.

The content push service providing server 600 provides various push contents in accordance with a setting request of the mobile terminal 100.

The detailed structure of the mobile terminal 100 for providing content push services will now be described.

FIG. 2 is a diagram illustrating an internal structure of a mobile terminal for providing a content push service according to an exemplary embodiment of the present invention.

Referring to FIG. 2, the mobile terminal 100 includes a memory 120, a controller 140, and a communication unit 160.

The memory 120 stores applications 122 that receive various push contents and an application operation module 124 that executes the applications.

The controller 140 activates the application operation module 124 to set a user datagram protocol (UDP) port with the content push service providing server 600. The controller 140 drives a corresponding application of push contents, which will be provided by the content push service providing server 600 through the predetermined UDP port.

The communication unit 160 receives push contents in a state where a corresponding application is executed from among the applications 122 stored in the memory 120.

Specifically, the controller 140 includes a traffic channel setting module 141, an IP allocation control module 142, an application operation module control module 144, and a push content providing module 146.

The traffic channel setting module 141 sets a traffic channel with the base station controller 300 through the base station 200.

When a power supply is turned on, the IP allocation control module 142 is allocated an IP address from the IP registration server 500 through the predetermined traffic channel with the base station controller 300 set by the traffic channel setting module 141.

The application operation module control module 144 is connected to the content push service providing server 600 through the user datagram protocol port in accordance with a request of the content push service providing server 600.

The application operation module control module 144 includes a receiver 144a, an activator 144b, and a transmitter 144c.

The receiver 144a receives an activation request of the application operation module 124, which is to be connected to the content push service providing server 600 through the user datagram protocol port, from the content push service providing server 600.

When receiving the activation request, the activator 144b calls the application operation module 124 that is stored in the memory 120 and activates the application operation module 124.

The transmitter 144c sends a response message on whether the called application operation module 124 is activated or not to the content push service providing server 600.

When the application operation module 124 is activated and an application provided with a content push service is driven, the push content providing module 146 receives the corresponding content push service from the content push service providing server 600 and transmits it to the corresponding application.

FIG. 3 is a diagram illustrating an internal structure of a content push service providing server according to an exemplary embodiment of the present invention.

Referring to FIG. 3, the content push service providing server 600 includes a terminal IP acquiring unit 610, an application driving requesting unit 620, a push content database (DB) 630, a push content providing unit 640, and a controller 650.

The terminal IP acquiring unit 610 acquires an IP of a mobile terminal that is to be provided with a content push service, through the IP registration server 500.

The application driving requesting unit 620 uses the acquired IP of the mobile terminal and requests the mobile terminal to drive an application that is to be provided with a content push service.

The push content database 630 stores various push contents to provide content push services for a plurality of terminals.

The push content providing unit 640 provides the push contents that are stored in the content push database 630 to the terminals.

When a content push service event for a specific terminal is generated, the controller 650 acquires the IP of the corresponding terminal through the terminal IP acquiring unit 610, and drives an application in the corresponding terminal through the application driving requesting unit 620. Then, the controller 650 performs a control operation such that the push content providing unit 640 provides the push contents to the corresponding terminal.

Hereinafter, a method of providing a content push service on the basis of the above-described structure will be described.

FIG. 4 is a flowchart illustrating a series of processes of a method of providing a content push service according to an exemplary embodiment of the present invention.

Referring to FIG. 4, when a power supply is turned on (step S101), the mobile terminal 100 calls the application operation module 124 from the memory 120 and operates the application operation module 124 (step S103).

Then, the mobile terminal 100 accesses the mobile communication network through the traffic channel setting module 141 in the controller 140 of the mobile terminal 100 and sets the traffic channel with the base station controller 300 (step S105). The mobile terminal 100 is allocated an IP from the IP registration server 500 through the IP allocation control module 142 (step S107).

The controller 140 releases the traffic channel when the IP allocation is completed (step S109).

Then, when a content push service event is generated in the content push service providing server 600 (step S111), the controller 650 of the content push service providing server 600 queries an IP address of the mobile terminal 100 (step S113) and receives the IP address from the IP registration server 500 through the terminal IP acquiring unit 610 (step S115).

Then, the controller 610 of the terminal, which receives the content push service, allows the application driving requesting unit 620 to request the packet data service node 400 to drive an application of the mobile terminal 100 through the user datagram protocol port (step S117). The packet data service node 400 transmits the request to the base station controller 300 (step S119). In this case, the user datagram protocol port is defined by a prior agreement between the mobile terminal 100 and the content push service providing server 600. The driving requested application is an application that is capable of providing the content push service, which is provided by the content push service providing server 600, to the mobile terminal 100. The application driving request and the IP address acquired in step S115 are transmitted.

If the application driving is requested (step S119), the base station controller 300 sets a traffic channel with the mobile terminal 100 using the IP address, which is transmitted together with the application driving request (step S121).

The base station controller 300 requests the mobile terminal 100 to drive the application through the predetermined traffic channel (step S123).

The application driving request from the base station controller 300 is received by the receiver 144a of the application operation control module 144 in the controller 140 through the communication unit 160 of the mobile terminal 100. Accordingly, in order to drive the application according to the application driving request received by the receiver 144a, the activator 144b calls and activates the application operation module 124 that is stored in the memory 120, and the activated application operation module 124 drives the driving requested application. After the corresponding application is driven, the transmitter 144c sends a response message for the application driving request to the packet data service node 400 through the base station controller 300 (step S125).

Then, the packet data service node 400 sends the response message to the content push service providing server 600 (step S127).

The application that receives push contents to be provided by the content push service providing server 600 is driven by the mobile terminal 100 through the user datagram protocol, and is connected to the content push service providing server 600.

Accordingly, the push content providing unit 640 of the content push service providing server 600 searches the push contents provided to the mobile terminal 100 from the push content database 630, and provides the push contents to the mobile terminal 100 through the user datagram protocol. The mobile terminal 100 receives the push contents provided by the content push service providing server 600 through the corresponding application and executes the push contents (step S131).

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

INDUSTRIAL APPLICABILITY

According to the exemplary embodiment of the present invention, the well-known user datagram protocol (UDP) port is set between the mobile terminal and the content push providing server, and thus, the content push service providing server can drive an application in the mobile terminal through the corresponding user datagram protocol port.

Accordingly, it is not necessary to select a specific identifier for each of existing applications and recognize a specific identifier for each node of a mobile communication network.

The invention claimed is:

1. A mobile terminal for providing a content push service, the mobile terminal comprising:
a memory that stores applications for receiving various push contents and an application operation module for executing the applications; and
a controller configured to: set a user datagram protocol (UDP) port with a server for providing the content push service by request of the server, activate the application operation module that is stored in the memory, and drive an application that receives push contents to be provided by the server through the set user datagram protocol port,
wherein when a power supply of the mobile terminal is turned ON, the controller is configured to: set a traffic channel with a mobile communication network, allow an IP address to be allocated in an allocation from the mobile communication network through the traffic channel, and release the traffic channel immediately when the allocation is completed with no intervening signaling, when a driving request for the application is received through the traffic channel with the mobile communication network, and the traffic channel is set by using the IP address.

2. The mobile terminal of claim 1, wherein the controller includes:
an application operation module control module that sets the user datagram protocol port with the server by the request of the server, activates the application operation module, and drives the application; and
a push content providing module that provides the push contents to be provided by the server through the user datagram protocol port to the application.

3. The mobile terminal of claim 2, wherein the controller further includes:
a traffic channel setting module that sets a traffic channel with a mobile communication network providing a mobile communication service to the mobile terminal; and
an IP address allocation control module that is allocated with the IP address from the mobile communication network.

4. The mobile terminal of claim 3, wherein the application operation module control module includes:
a receiver that receives the driving request for the application from the server through the user datagram protocol port;
a driver that calls and activates, when the driving request for application is received, the application operation module that is stored in the memory; and
a transmitter that sends a response message for the driving request for the application to the server.

5. A method of operating a mobile terminal to provide a content push service, the method comprising:
when a power supply of the mobile terminal is turned ON, setting a traffic channel with a mobile communication network;
allowing an IP address to be allocated in an allocation from the mobile communication network through the set traffic channel;
releasing the traffic channel immediately when the allocation is completed with no intervening signaling;
receiving a driving request for an application that receives push contents provided by a server for providing a content push service through a user datagram protocol port set between the server and the mobile terminal;
activating an application operation module for executing the application and driving the application by the activated application operation module in response to the driving request for the application; and
receiving the push contents provided by the server through the user datagram protocol port and executing the push contents through the driven application.

6. The method of claim 5, wherein, in the activating of the application operation, a response message for the driving request is sent to the server after the application is driven.

7. An apparatus for providing a content push service to a mobile terminal through a mobile communication network, the apparatus comprising:
a terminal IP address acquiring unit configured to acquire an IP address of a mobile terminal that receives the content push service, through the mobile communication network;
an application driving requesting unit configured to use the IP address acquired by the terminal IP address acquiring unit and requests the mobile terminal to drive an application that receives the content push service;
a push content providing unit configured to provide push contents to the mobile terminal through the mobile communication network; and
a controller configured to acquire the IP address of the mobile terminal through the terminal IP address acquiring unit, drive the application in the mobile terminal through the application driving requesting unit, and provide the push content service to the mobile terminal through the push content providing unit,
wherein the IP address of a mobile terminal is the IP address that when a power supply of the mobile terminal is turned ON, a traffic channel with the mobile communication network is set, the mobile terminal IP address is allocated in an allocation to the mobile terminal from the mobile communication network through the traffic channel, and the traffic channel is released immediately when the allocation is completed with no intervening signaling.

8. The apparatus of claim 7, wherein the controller provides the content push service to the mobile terminal when a content push service event for the mobile terminal is generated.

9. The apparatus of claim 7, wherein the application driving requesting unit and the push content providing unit provide the content push service to the mobile terminal through a user datagram protocol port set between the apparatus and the mobile terminal through the mobile communication network.

10. A method in which a server for providing a content push service provides the content push service to a mobile terminal through a mobile communication network, the method comprising:

acquiring an IP address of the mobile terminal through the mobile communication network;

transmitting a driving request for an application that receives push contents provided by the server through a user datagram protocol port set between the server and the mobile terminal using the IP address, to the mobile terminal; and providing the content push service to the mobile terminal through the mobile communication network when a response message for the driving request for the application is received from the mobile terminal, wherein when a power supply of the mobile terminal is turned ON, a traffic channel with the mobile communication network is set, the IP address is allocated in an allocation to the mobile terminal from the mobile communication network through the traffic channel, and the traffic channel is released immediately when the allocation is completed with no intervening signaling.

11. The method of claim 10, further comprising, before the acquiring of the IP address of the mobile terminal through the mobile communication network:

detecting when a content push service event for the mobile terminal is generated, wherein, when the content push service event is detected, the content push service is provided to the mobile terminal.

12. The method of claim 10, further comprising, between the transmitting of the driving request for the application to the mobile terminal and the providing of the content push service to the mobile terminal through the mobile communication network, determining whether a response message is received from the mobile terminal in response to the driving request for the application transmitted to the mobile terminal, wherein, when the response message for the driving request for the application is received from the mobile terminal and the corresponding response message indicates that the application is completely driven, the providing of the content push service to the mobile terminal through the mobile communication network is performed.

13. A method of providing a content push service in a mobile communication network, the method comprising:

when a power supply of the mobile terminal is turned ON, setting a traffic channel with the mobile terminal and the server by a request of the mobile terminal;

allocating an IP address in an allocation to the mobile terminal by the request of the mobile terminal;

releasing the traffic channel set between the mobile terminal and the server immediately when the allocation is completed with no intervening signaling;

receiving a driving request for an application in a mobile terminal that receives the content push service from a server for providing the content push service connected to the mobile communication network, the driving request including the IP address of the mobile terminal, and setting a traffic channel between the mobile terminal and the server;

transmitting the driving request for the application received from the server to the mobile terminal through the set traffic channel; and providing the content push service provided by the server through a user datagram protocol port set between the mobile terminal and the server to the mobile terminal.

14. The method of claim 13, wherein the receiving of the driving request for the application in the mobile terminal and the setting of the traffic channel between the mobile terminal and the server includes:

providing the IP address allocated to the mobile terminal by the request of the server;

receiving the driving request for the application from the server; and setting the traffic channel between the mobile terminal and the server using the IP address.

15. The method of claim 14, wherein the providing of the content push service provided by the server through the user datagram protocol port set between the mobile terminal and the server to the mobile terminal includes:

receiving a response message for the driving request for the application from the mobile terminal and sending the response message to the server; and receiving the content push service provided by the server and providing the content push service to the mobile terminal.

* * * * *